(12) United States Patent
Smith et al.

(10) Patent No.: US 7,641,039 B2
(45) Date of Patent: Jan. 5, 2010

(54) SKEWED SLAT CONTROL SYSTEM FOR ARTICLE CONVEYOR

(75) Inventors: Thomas B. Smith, Rockford, MI (US); Robert W. Gallatin, Grand Rapids, MI (US); Bradley D. Baldwin, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 59 days.

(21) Appl. No.: 12/116,265

(22) Filed: May 7, 2008

(65) Prior Publication Data
US 2008/0264765 A1 Oct. 30, 2008

Related U.S. Application Data

(63) Continuation of application No. 11/532,690, filed on Sep. 18, 2006, now Pat. No. 7,370,751.

(60) Provisional application No. 60/747,953, filed on May 23, 2006.

(51) Int. Cl.
 *B65G 47/10* (2006.01)
(52) U.S. Cl. ............ 198/370.03; 198/370.02; 198/810.03
(58) Field of Classification Search ........... 198/810.03, 198/370.02, 370.03, 370.07, 370.08, 890.1
See application file for complete search history.

(56) References Cited

U.S. PATENT DOCUMENTS

| | | | |
|---|---|---|---|
| 3,571,705 A | 3/1971 | Crane et al. | |
| 3,688,557 A | 9/1972 | Marinus | |
| 3,718,040 A | 2/1973 | Freeman et al. | |
| 3,924,461 A | 12/1975 | Stover | |
| 3,974,689 A | 8/1976 | McNeil | |
| 4,005,601 A | 2/1977 | Botello | |
| 4,262,776 A | 4/1981 | Wilson et al. | |
| 4,417,466 A | 11/1983 | Panetti | |
| 4,535,699 A | 8/1985 | Bühler | |
| 4,537,285 A | 8/1985 | Brown et al. | |
| 4,566,339 A | 1/1986 | Davidson et al. | |

(Continued)

OTHER PUBLICATIONS

A-1, Field Trip Report by Brian Smith dated Apr. 26, 2005-May 6, 2005.

(Continued)

*Primary Examiner*—James R Bidwell
(74) *Attorney, Agent, or Firm*—Van Dyke, Gardner, Linn & Burkhart, LLP

(57) ABSTRACT

A positive displacement article sorter and method of monitoring a positive displacement article sorter, wherein the article sorter includes a frame, an endless web traveling in a longitudinal direction about the frame and an electric motor driving the endless web. The endless web is defined by a pair of continuous chains and a plurality of cross members connected at opposite ends with the chain. The positive displacement sorter includes a plurality of pusher shoes, each laterally traveling along at least one of the cross members. A sensing assembly is provided that has first and second portions. The first portion of said sensing assembly is positioned at the web. The second portion of said sensing assembly is positioned at a stationary location. The first portion of said sensing assembly is sensed with the second portion of the sensing assembly as the first portion of said sensing assembly travels about the frame. A parameter of the web is determined from an output of the sensing assembly.

38 Claims, 14 Drawing Sheets

U.S. PATENT DOCUMENTS

| | | | |
|---|---|---|---|
| 4,803,886 A | 2/1989 | May et al. | |
| 4,908,767 A | 3/1990 | Scholl et al. | |
| 5,127,510 A | 7/1992 | Cotter et al. | |
| 5,272,924 A | 12/1993 | Tassic et al. | |
| 5,305,066 A | 4/1994 | Koh et al. | |
| 5,433,679 A | 7/1995 | Szymczak et al. | |
| 6,195,518 B1 * | 2/2001 | Bennett et al. | 198/810.03 |
| 6,681,160 B2 | 1/2004 | Bidaud | |
| 6,742,625 B2 | 6/2004 | Rodemer et al. | |
| 6,865,955 B2 | 3/2005 | Nassar et al. | |
| 6,951,274 B2 * | 10/2005 | Zeitler et al. | 198/370.02 |
| 7,081,824 B2 | 7/2006 | Gilbert | |
| 7,164,975 B2 | 1/2007 | Bidaud | |
| 7,254,896 B2 | 8/2007 | Carr et al. | |
| 7,325,669 B2 | 2/2008 | Frost et al. | |
| 7,337,682 B2 | 3/2008 | Otto et al. | |
| 7,370,751 B2 | 5/2008 | Smith et al. | |
| 7,497,316 B2 * | 3/2009 | Hysell et al. | 198/370.02 |
| 2006/0000693 A1 * | 1/2006 | Zeitler et al. | 198/370.02 |
| 2006/0272930 A1 * | 12/2006 | Cotter et al. | 198/810.03 |
| 2007/0203621 A1 | 8/2007 | Haugen et al. | |

OTHER PUBLICATIONS

A-2, E-mail from Bradley D. Baldwin to Thomas B. Smith dated May 3, 2005, with attachment entitled Description of Operation Correcting Slat Skew on the RS-200.

A-3, E-mail from Jose Bautista to various persons at Assignee dated Jun. 2, 2007, and E-mail from Michael B. Watson to Jose Bautista dated Jun. 3, 2005.

A-4, E-mail from Robert W. Gallatin to M. Malloc dated Sep. 23, 2005.

A-5, Sales Proposal from Assignee dated Oct. 5, 2005.

Brochure entitled "ORSCO® Series 170," publication date unknown.

* cited by examiner

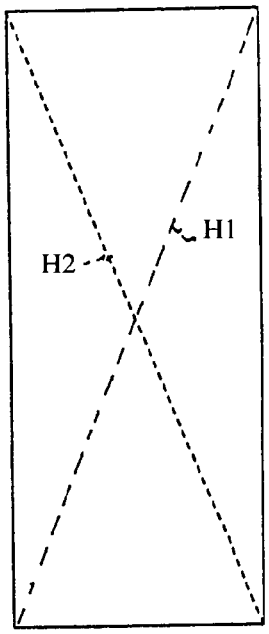
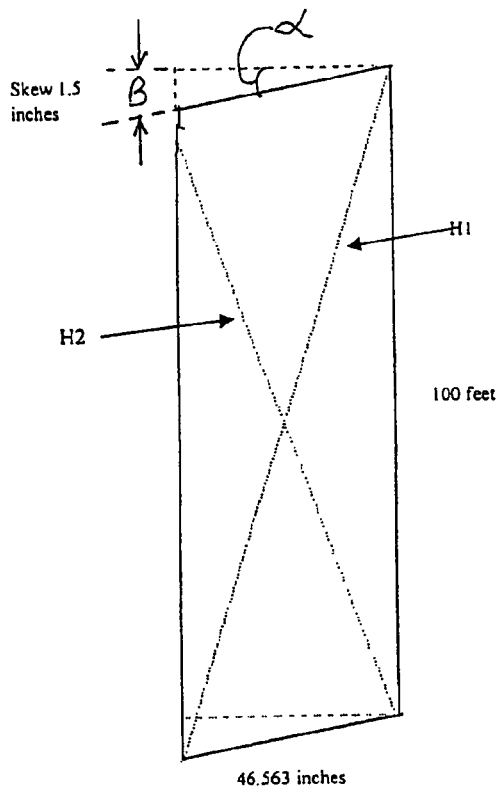
Fig 6
Fig 7
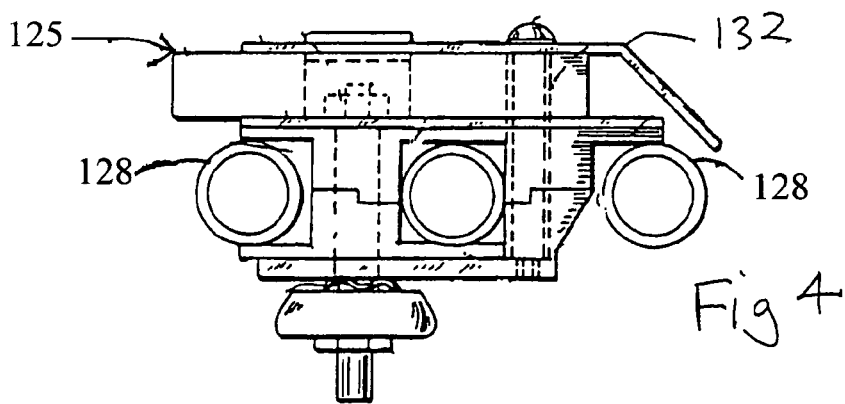
Fig 4

| Pulses Difference | Ratio | Skew B | Angle α |
| --- | --- | --- | --- |
| 1 | 0.001767 | 0.082269 | 0.101233 |
| 2 | 0.003534 | 0.164539 | 0.202466 |
| 3 | 0.005301 | 0.246808 | 0.303699 |
| 4 | 0.007067 | 0.329078 | 0.404934 |
| 5 | 0.008834 | 0.411347 | 0.506170 |
| 6 | 0.010601 | 0.493617 | 0.607407 |
| 7 | 0.012368 | 0.575886 | 0.708646 |
| 8 | 0.014135 | 0.658156 | 0.809888 |
| 9 | 0.015902 | 0.740425 | 0.911132 |
| 10 | 0.017668 | 0.822695 | 1.012379 |
| 11 | 0.019435 | 0.904964 | 1.113629 |
| 12 | 0.021202 | 0.987234 | 1.214882 |
| 13 | 0.022969 | 1.069503 | 1.316140 |
| 14 | 0.024736 | 1.151773 | 1.417401 |
| 15 | 0.026503 | 1.234042 | 1.518667 |
| 16 | 0.028269 | 1.316312 | 1.619937 |
| 17 | 0.030036 | 1.398581 | 1.721213 |
| 18 | 0.031803 | 1.480851 | 1.822494 |
| 19 | 0.033570 | 1.563120 | 1.923781 |
| 20 | 0.035337 | 1.645390 | 2.025074 |

Fig 8

| Skew In Inch | Zone 1 Time Off (Seconds) (Side A) | Zone 2 Time Off (Seconds) (Side B) | Zone 3 Time Off (Seconds) (Side A) | Zone 4 Time Off (Seconds) (Side B) | Zone 5 Time Off (Seconds) (Side A) | Zone 6 Time Off (Seconds) (Side B) |
|---|---|---|---|---|---|---|
| -2.00 - -9999 | 17 | 1 | 17 | 1 | 9 | 9 |
| -1.75 - -2.0 | 16 | 2 | 16 | 2 | 9 | 9 |
| -1.50 - -1.75 | 15 | 3 | 15 | 3 | 9 | 9 |
| -1.25 - -1.5 | 14 | 4 | 14 | 4 | 9 | 9 |
| -1.00 - -1.25 | 13 | 5 | 13 | 5 | 9 | 9 |
| -0.75 - -1.00 | 12 | 6 | 12 | 6 | 9 | 9 |
| -0.50 - -0.75 | 11 | 7 | 11 | 7 | 9 | 9 |
| -0.25 - -0.50 | 10 | 8 | 10 | 8 | 9 | 9 |
| 0.00 - -0.25 | 9 | 9 | 9 | 9 | 9 | 9 |
| 0.25 - 0.00 | 9 | 9 | 9 | 9 | 9 | 9 |
| 0.50 - 0.25 | 8 | 10 | 8 | 10 | 9 | 9 |
| 0.75 - 0.50 | 7 | 11 | 7 | 11 | 9 | 9 |
| 1.00 - 0.75 | 6 | 12 | 6 | 12 | 9 | 9 |
| 1.25 - 1.00 | 5 | 13 | 5 | 13 | 9 | 9 |
| 1.50 - 1.25 | 4 | 14 | 4 | 14 | 9 | 9 |
| 1.75 - 1.50 | 3 | 15 | 3 | 15 | 9 | 9 |
| 2.00 - 1.75 | 2 | 16 | 2 | 16 | 9 | 9 |
| 9999 - 2.00 | 1 | 17 | 1 | 17 | 9 | 9 |

Fig. 20

SKEWED SLAT CONTROL SYSTEM FOR ARTICLE CONVEYOR

CROSS REFERENCE TO RELATED APPLICATION

This application is a continuation of prior U.S. patent application Ser. No. 11/532,690, filed on Sep. 18, 2006, now U.S. Pat. No. 7,370,751, which claims priority from U.S. provisional patent application Ser. No. 60/747,953, filed on May 23, 2006, the disclosure of which is hereby incorporated herein by reference in its entirety.

BACKGROUND OF THE INVENTION

The present invention pertains to conveyor systems having an endless web that is defined by laterally extending parallel cross members that are connected at opposite ends, such as by chains, and in particular to a method of correcting skew in the cross members resulting from unequal expansion of the chains on opposite sides of the web. The invention is particularly adapted for use with article sorters, but may be applied to other such conveyor systems.

An article sorter, such as the RS200 positive displacement sorter marketed by Dematic Corporation of Grand Rapids, Mich., has an endless web that is made up elongated parallel slats that are interconnected by a matched pair of chains. The web is supported by carrier wheels attached to the sides of the chains. Because of the nature of a positive displacement sorter, wear on the chains tends to not be the same. Therefore, one chain tends to stretch more than the other chain. This can cause the slats to become skewed. Skew is where the slats, which are normally perpendicular to the direction of movement of the web, become non-perpendicular to such direction. Skew causes the carrier wheels to be at an angle to the direction of movement of the web. This causes an increase in chain drag resulting in additional energy required to propel the web as well as extra wear on the sorter. Also, excessive skew of the slats can cause problems with tracking articles on the sorter and proper diverting of the articles to the desired lanes for sortation.

Uneven elongation of the chains leads to one of the chains requiring replacement prematurely. As the chains are a matched set, uneven elongation of either chain leads to both of the chains being replaced prematurely. This is very expensive because it essentially requires an almost complete disassembly of the web.

SUMMARY OF THE INVENTION

The present invention is directed to a positive displacement article sorter and method of monitoring a positive displacement article sorter. A positive displacement article sorter includes a frame, an endless web traveling in a longitudinal direction about the frame and an electric motor driving the endless web. The endless web is defined by a pair of continuous chains and a plurality of cross members connected at opposite ends with the chain. The positive displacement sorter includes a plurality of pusher shoes, each laterally traveling along at least one of the cross members.

According to an aspect of the invention, a sensing assembly is provided that has first and second portions. The first portion of said sensing assembly is positioned at the web. The second portion of said sensing assembly is positioned at a stationary location. The first portion of said sensing assembly is sensed with the second portion of the sensing assembly as the first portion of said sensing assembly travels about the frame. A parameter of the web is determined from an output of the sensing assembly.

The parameter of the web may be one that affects electrical energy consumed by the electric motor. The parameter of the web may be a function of the position of the web.

The sensing assembly may be a magnetic sensor, a proximity sensor or a photo sensor. The first portion of the sensing assembly may be positioned at one or more of the cross members. The first portion of the sensing assembly may be positioned at two spaced apart ones of the cross members.

The plurality of cross members may include a plurality of closely spaced slats. Each of the slats may have a generally planar upper surface, wherein the web defines a flat-top conveying surface.

According to another aspect of the invention, positions of opposite lateral sides of the endless web are sensed in the longitudinal direction by a sensing assembly as the endless web travels about the frame. A control is provided that is responsive to the sensing assembly and is adapted to determine whether one of the opposite lateral sides of the endless web lags or leads the other of the opposite lateral sides in the longitudinal direction as a function of the positions of the opposite lateral sides of the endless web in the longitudinal direction.

The control may indicate drag of the endless web on the frame as a function of an amount that one of the opposite lateral sides lags or leads the other of the opposite lateral sides in the longitudinal direction.

The control may sense positions of the opposite lateral sides of the endless web at an article input end of the endless web.

A first portion of the sensing assembly may be at opposite lateral sides of the endless web. A second portion of the sensing assembly may be at a stationary location. The second portion senses the first portion of said sensing assembly as the first portion of said sensing assembly travels about the frame. The sensing assembly may include a magnetic sensor, a proximity sensor or a photo sensor.

The first portion of the sensing assembly may be at opposite lateral ends of at least one of the cross members and may be at opposite lateral ends of at least two spaced apart ones of the cross members. The control may determine whether one of the opposite lateral sides of the endless web lags or leads the other of the lateral sides in the longitudinal direction as a function of diagonal distances measured between the first portion of the sensing assembly at opposite lateral ends of the at least two spaced apart ones of the cross members.

The plurality of cross members may be a plurality of closely spaced slats. Each of the slats may have a generally planar upper surface, wherein the web defines a flat-top conveying surface.

These and other objects, advantages and features of this invention will become apparent upon review of the following specification in conjunction with the drawings.

BRIEF DESCRIPTION OF THE DRAWINGS

FIG. 4 is a side elevation of a conveyor system illustrating an alternative embodiment thereof;

FIG. 6 is an illustration of measurement of cross members that do not exhibit skew;

FIG. 7 is the same view as FIG. 6 with cross members that exhibit skew;

FIG. 8 is a table illustrating determination of amount of skew;

FIG. 20 is a diagram illustrating use of duty cycle variation for differential application of lubricant.

DETAILED DESCRIPTION OF THE PREFERRED EMBODIMENT

Figure 1:
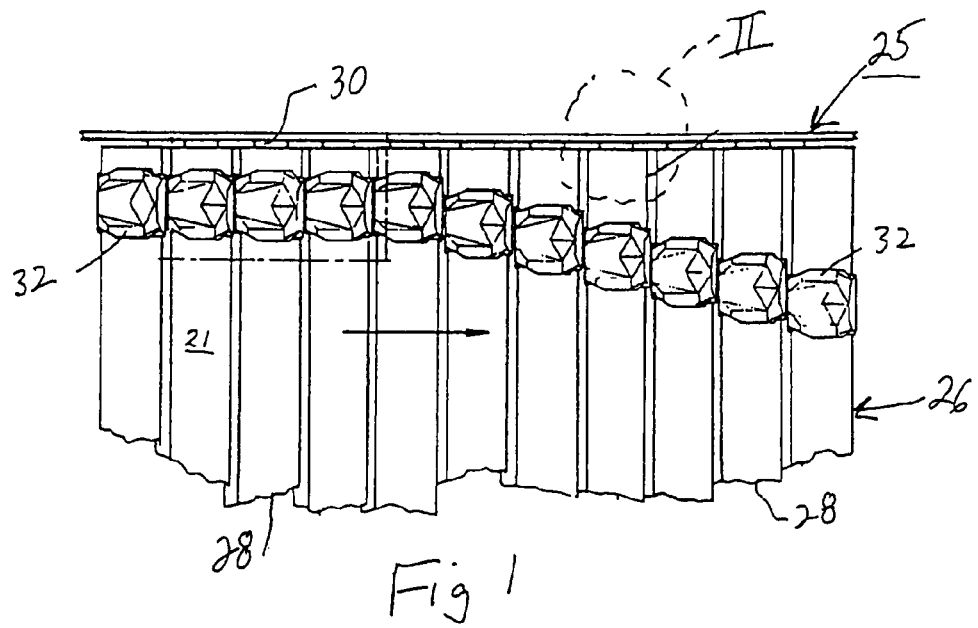
FIG. 1 is a top plan view of a conveyor system according to the invention.
Figure 2:
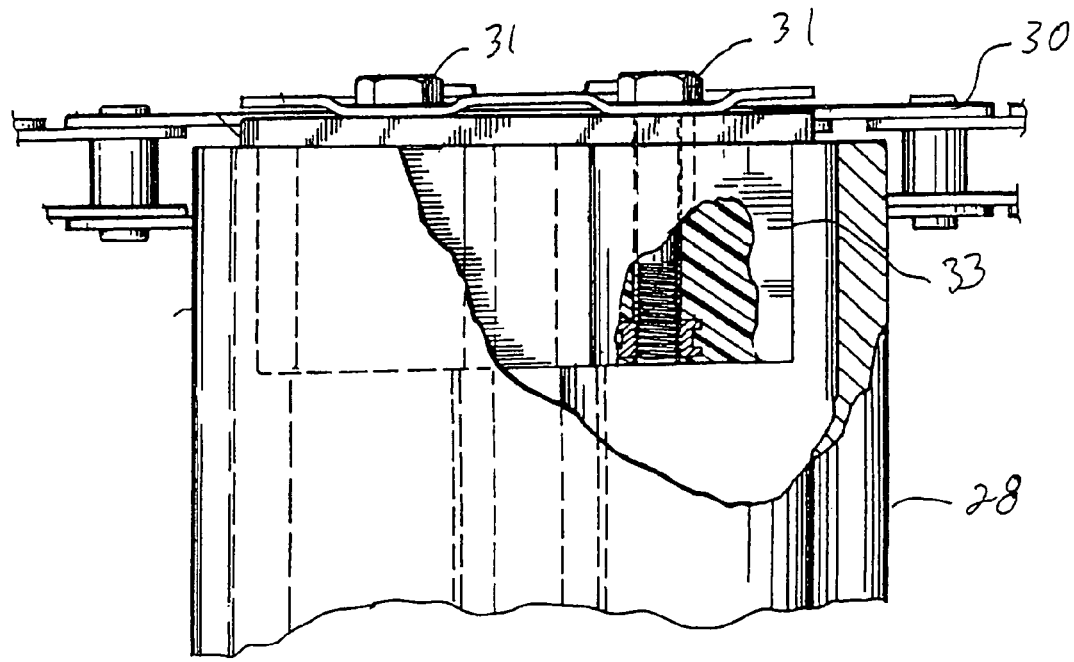
FIG. 2 is an enlarged portion of the conveyor system illustrated at II in FIG. 1.
Figure 3:
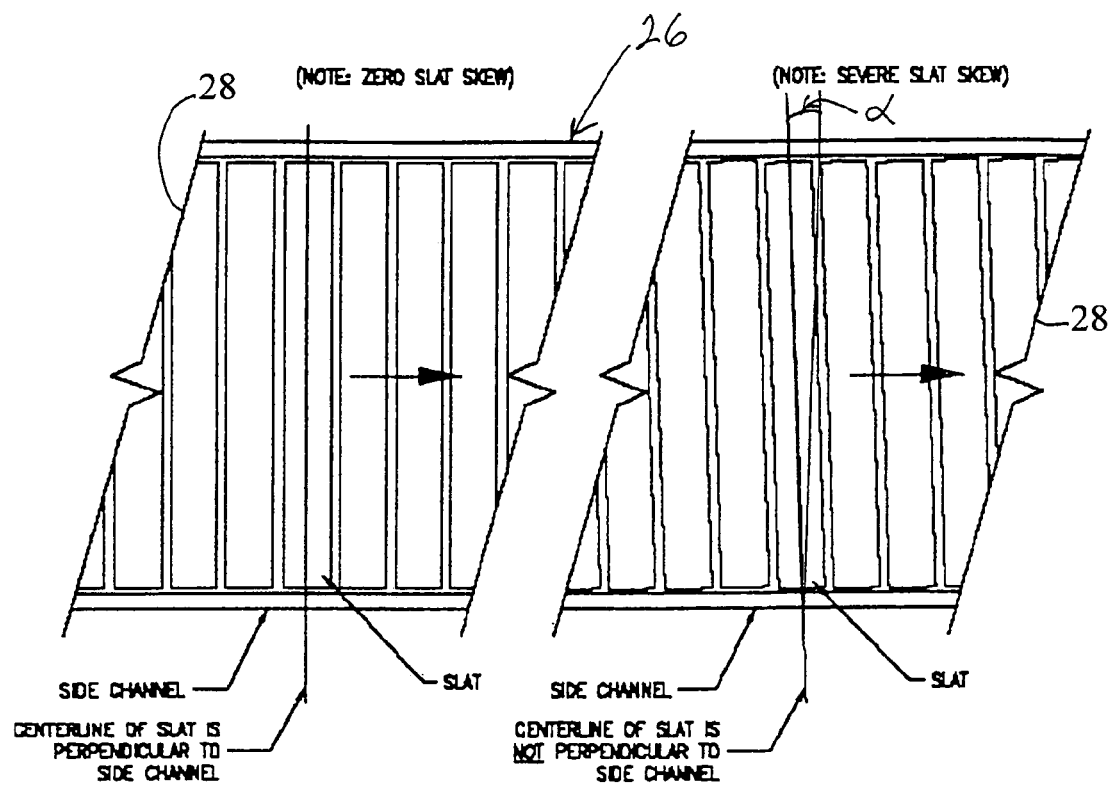
FIG. 3 is the same view as FIG. 1 illustrating skew of a cross member.

Referring now to the drawings and the illustrative embodiments depicted therein, a conveyor system 25 includes an endless web 26 made up of a plurality of cross members 28 that are interconnected at opposite ends by attaching the cross members, using fasteners 31 and special adapters 33, to left and right chains 30 (FIGS. 1-3). The endless web travels in a longitudinal direction, which is illustrated by the arrow in FIG. 1. In the illustrative embodiment, conveyor system 25 is a positive displacement shoe and slat sorter of the type disclosed in commonly assigned U.S. Pat. Nos. 4,738,347; 5,127,510; 5,165,515; 5,732,814; 5,927,465; 6,041,909; 6,513,642; 6,814,216; 6,860,383; and 6,935,483, the disclosures of which are hereby collectively incorporated herein by reference.

In the embodiment illustrated in FIGS. 1 through 3, cross members 28 are closely spaced slats having generally planar upper surfaces thereby defining a flat-top conveying surface. A plurality of pusher shoes 32 is provided. Each pusher shoe selectively travels laterally along one of the cross members in order to laterally displace an article traveling on the conveying surface. This causes the article to be diverted to one of several spurs (not shown) in order to sort the articles according to some scheme. In an alternative conveyor system 125, cross members 128 are in the form of rounded tubular members and pusher shoes 132 travel along a plurality of cross-members (FIG. 4).

As can be seen by reference to FIG. 3, conveyor system 25 is subject to a condition, known as "slat skew," in which cross members 28 become non-perpendicular to the longitudinal direction of propulsion of web 26, which is indicated by the arrows in FIG. 3. The amount of slat skew is indicated by the angle α, but also can be expressed as the difference between the position of one end of a cross member 28 from the other end of the cross member. Skew can be both plus or minus depending upon which lateral end of the slat lags the other end. Slat skew is caused when chains 30 stretch unevenly from one side of the web to the other side. As the skew on the slats increases, carrier wheels 35 will be angled to the direction of flow which pushes the web into the side wear strip (not shown) and causes an increase in chain drag. Increases in chain drag require more horsepower to pull the chain which increases the amount of electrical energy consumed. Excess slat skew may also cause article tracking and divert problems.

Figure 5:
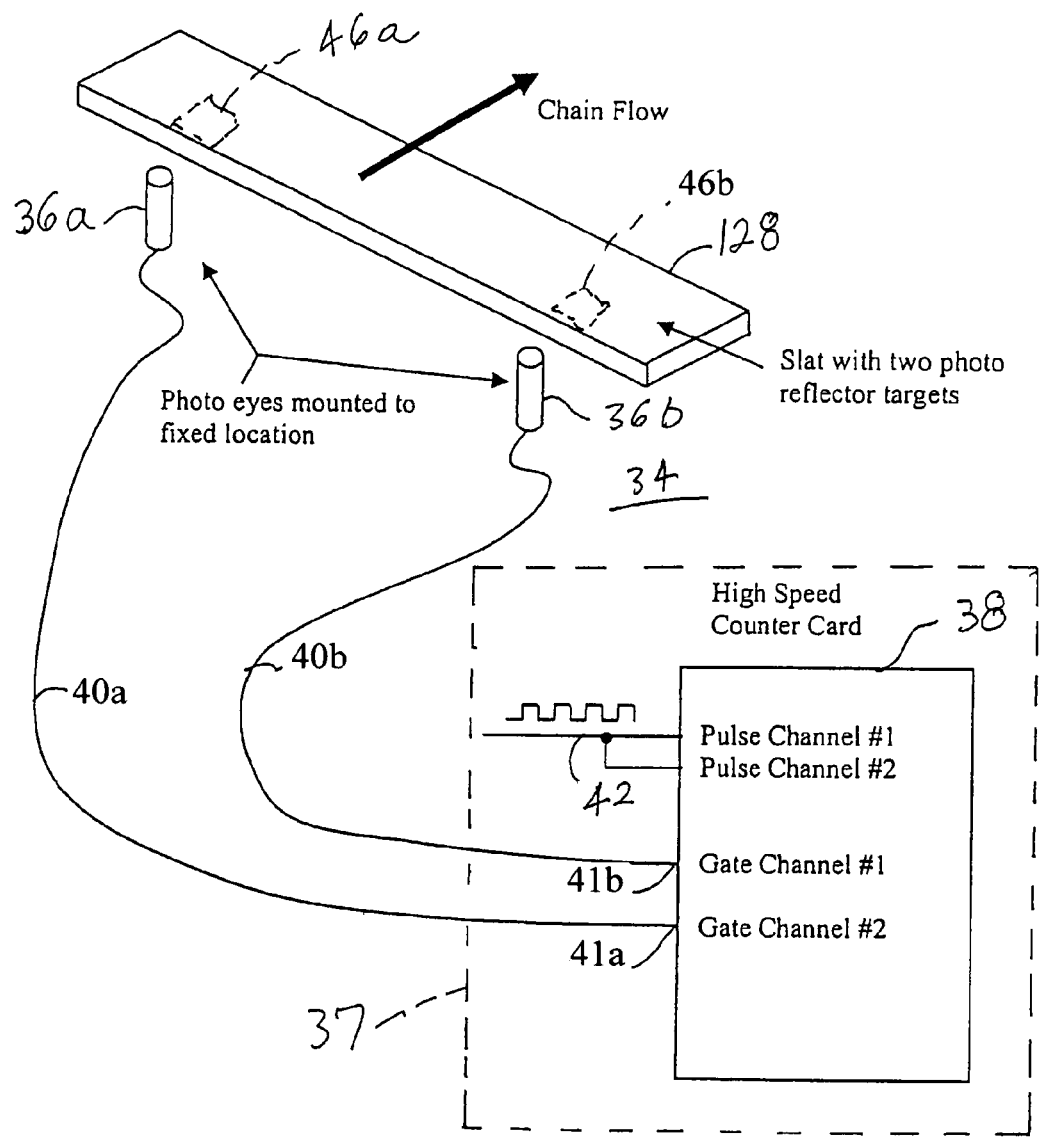
FIG. 5 is a block diagram of a skew detector system.

In order to overcome slat skew, a skew detector 34 is provided (FIG. 5). Skew detector 34 includes laterally spaced apart sensors 36a, 36b, which are positioned to identify laterally spaced apart triggers 46a, 46b on one of the slats. In the illustrative embodiment, triggers 46a, 46b are magnetic targets and sensors 36a, 36b are magnetic proximity sensors which detect the magnetic target. A pair of targets 46a, 46b are mounted to each of a "start" cross member 128 and an "end" cross member (not shown). The "start" and "end" cross members are spaced apart in web 26 by an amount that, in the illustrated embodiments, is 100 feet. While the slat spacing is not critical, it should be less than half of the web length. Sensors 36a, 36b are connected via conductors 40a, 40b with inputs 41a, 41b of a high-speed counter circuit 38. Counter circuit 38 is an input card of a control system 37, such as a programmable logic controller of the type known in the art. In the illustrative embodiment, control system 37 is a Momentum™ programmable logic controller (PLC) marketed by Modicon. A clock signal, which is 1 millisecond in the illustrated embodiments, is received on an input 42 of counter circuit 38. In operation, counter circuit 38 counts the number of clock pulses 42 beginning with the detection of the respective targets 46a, 46b on the "start" cross member 128 and ending with detection of the corresponding triggers 46a, 46b on the "end" cross member (not shown). In this manner, counter circuit 38 counts the amount of time between passage of each lateral end of the "start" cross member to the corresponding lateral end of the "end" cross member. Counter circuit 38 also counts the number of clock pulses along the diagonals between a start trigger 46a and end trigger 46b and between a start trigger 46b and end trigger 46a. The diagonal measurements are designated H1 and H2. The magnetic targets on the start and end slats may be distinguishable, such as by coding, or the like, but this is not always necessary. Skew detector 34 is positioned at an upstream end of web 26, such as where articles are placed onto the web. The reason is that web 26 is typically driven at a downstream end where all articles have been discharged from the web by a pair of sprockets driving the corresponding chains 30. The drive sprockets (not shown) are fixed to a motor-driven shaft and are thereby rotated in unison. Therefore, any skew in the cross members is not present at the discharge end, namely, the downstream end, of web 26. Idler sprockets (not shown) at the article input upstream portion of web 26 are independent freely rotatable. Therefore, slat skew is at a maximum at the article input end, namely, the upstream end, of web 26.

The manner in which slat skew detector 34 can measure skew in web 26 is illustrated in FIGS. 6 and 7. It can be seen that when there is no slat skew, the diagonal measurements H1 and H2 between the lateral ends of the "start" and "end" cross members are equal. Thus, when the number of pulses measured for H1 equals the number of pulses for H2 within a given tolerance, it is determined that there is no corrective action required. When the number of pulses for H1 exceeds those for H2, or vice versa, skew can be determined using the table in FIG. 8. Angle α is the angle of skew. "Skew B" is the amount of lag distance of one lateral end of the cross member with respect to the other lateral end of that cross member in the direction of web movement. Pulse differences can be either positive or negative. If positive, the amount of skew is as illustrated in FIG. 7. If negative, the skew is the opposite with the right lateral end of the cross members lagging behind the left lateral end of the cross members, as illustrated in FIG. 7.

Figure 9:
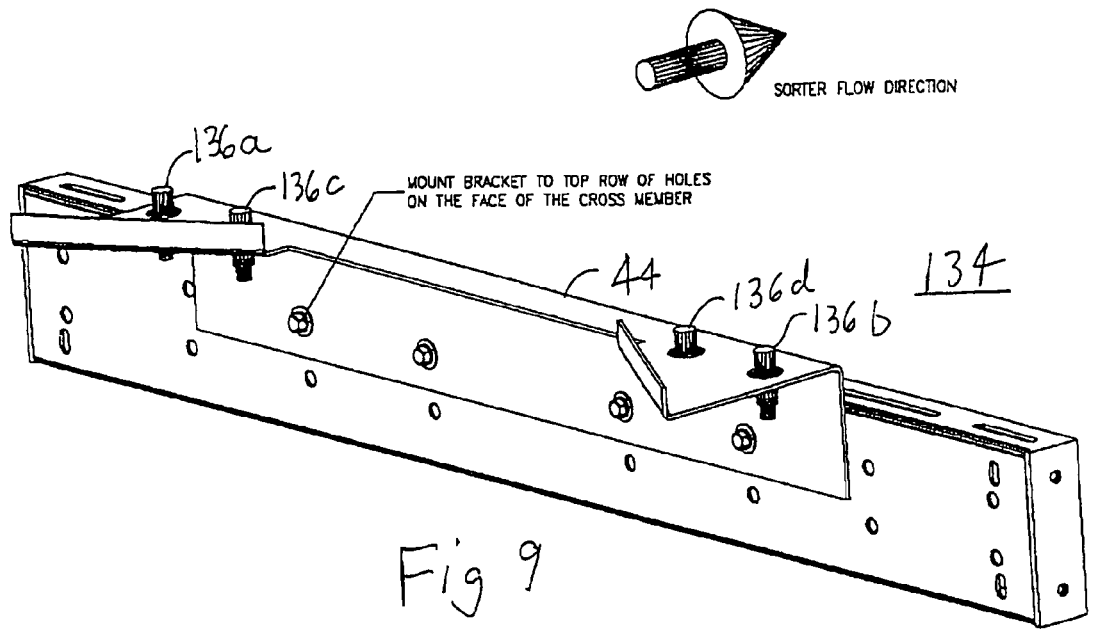
FIG. 9 is a perspective view of a skew detector assembly according to an alternative embodiment of the invention.
Figure 10:
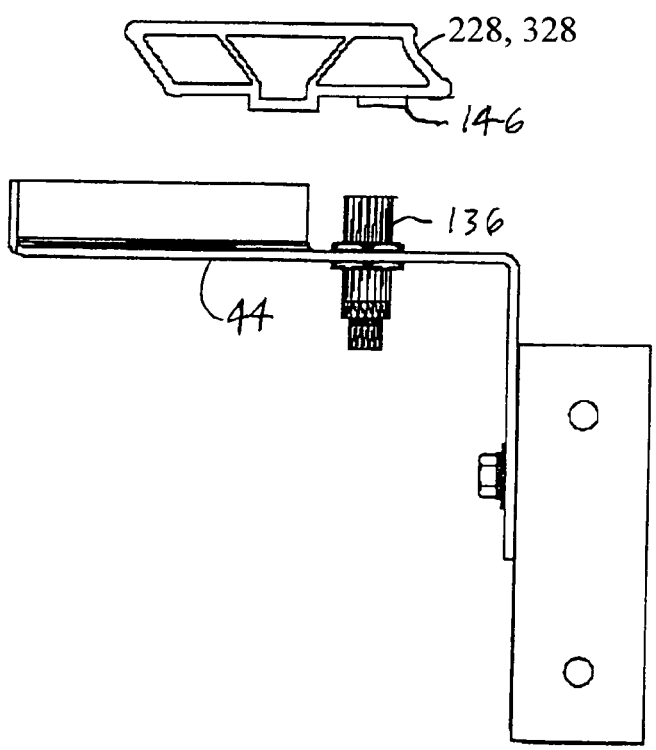
FIG. 10 is a side elevation of the skew detector assembly in FIG. 9.
Figure 11:
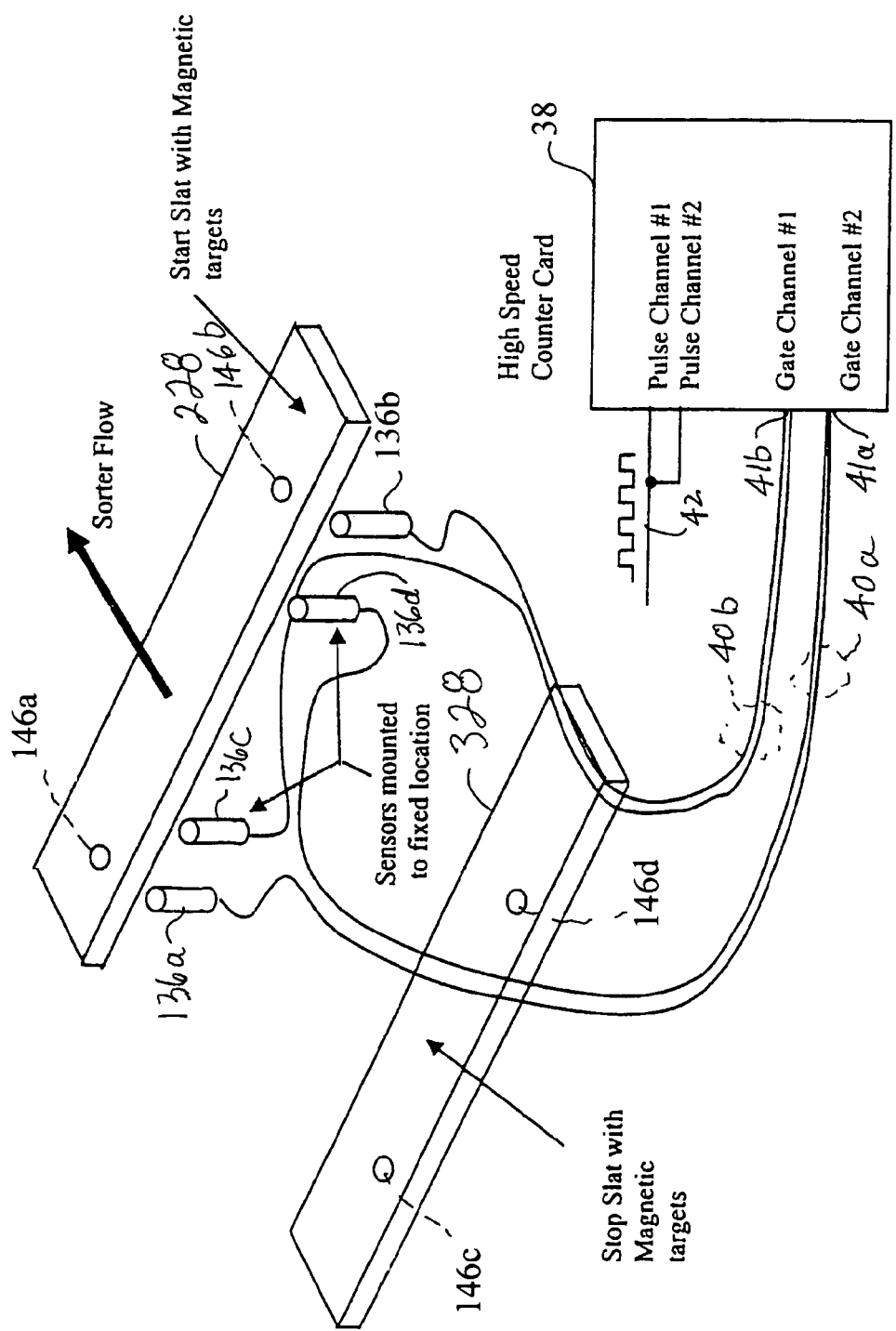
FIG. 11 is the same view as FIG. 5 of the skew detector assembly of FIGS. 9 and 10.
Figure 12:
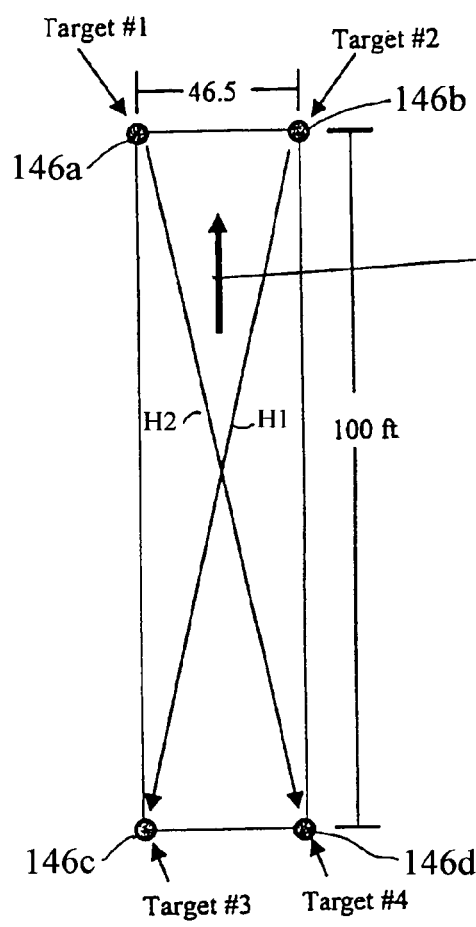
FIG. 12 is the same view as FIG. 6 using the skew detector system of FIGS. 9 through 11.
Figure 13:
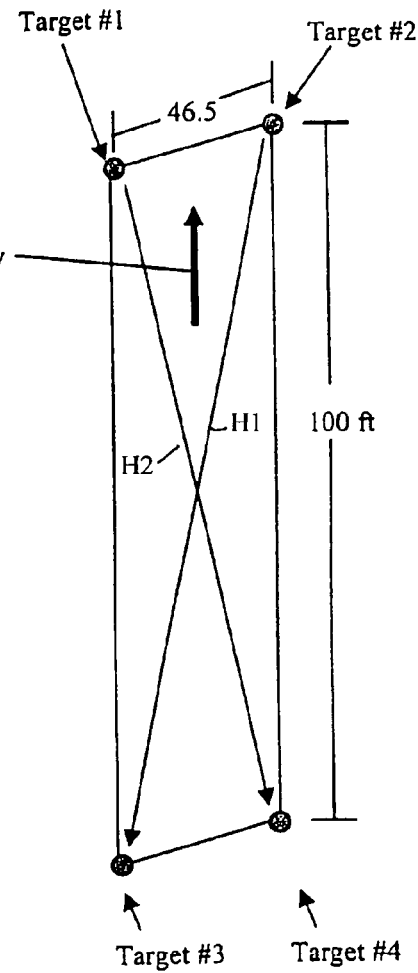
FIG. 13 is the same view as FIG. 7 using the skew detector system of FIGS. 9 through 11.

An alternative skew detector 134 includes a detector assembly 44 that is positioned below cross members 28 (FIGS. 9 and 10). Detector assembly 44 includes four detectors 136a, 136b, 136c, 136d, two of which are oriented toward each lateral end of the cross member. In the illustrative embodiment, sensors 136a-136d are magnetic sensors. Magnets 146a and 146b are positioned on a "start" cross member 228 in a position that they will be detected by sensors 136a and 136b. Two magnets 146c and 146d are positioned on "end" cross member 328 at a position that they will be detected by sensors 136c, 136d. Thus, skew detector 134 is similar to skew detector 34 except that separate sensors are used to detect the "start" cross member targets and the "end" cross member targets. Sensors 136a, 136d are connected to gate channel 41a. Sensors 136c and 136b are connected to gate channel 41b. Placement of magnets 146a-146d is illustrated in FIG. 11.

Determination of skew with skew detector 134 is similar to that for skew detector 34. There is a slight variation in measurement of diagonals H1 and H2 because the "end" triggers 146c, 146d are closer together than the "start" triggers 146a, 146b. However, any difference is minuscule over the 100-foot measurement range and is found to not appreciably affect the measurement.

Once the amount and direction of skew is determined, indicating that one of the chains 30 is stretched more than the other chain 30, a differential lubricant applicator 50 applies a lesser amount of lubricant to the less-stretched chain than to the more-stretched chain. This results in the less-stretched chain stretching more relative to the greater stretched chain, thereby resulting in the chains becoming more equal in stretch, thereby reducing the slat skew. While it may seem counterproductive to withhold lubricant from one of the two chains, it should be understood that it is the differential in the amount of stretch of the chain that results in premature wear to the chains, not the stretch of the chains, per se.

Figure 14:
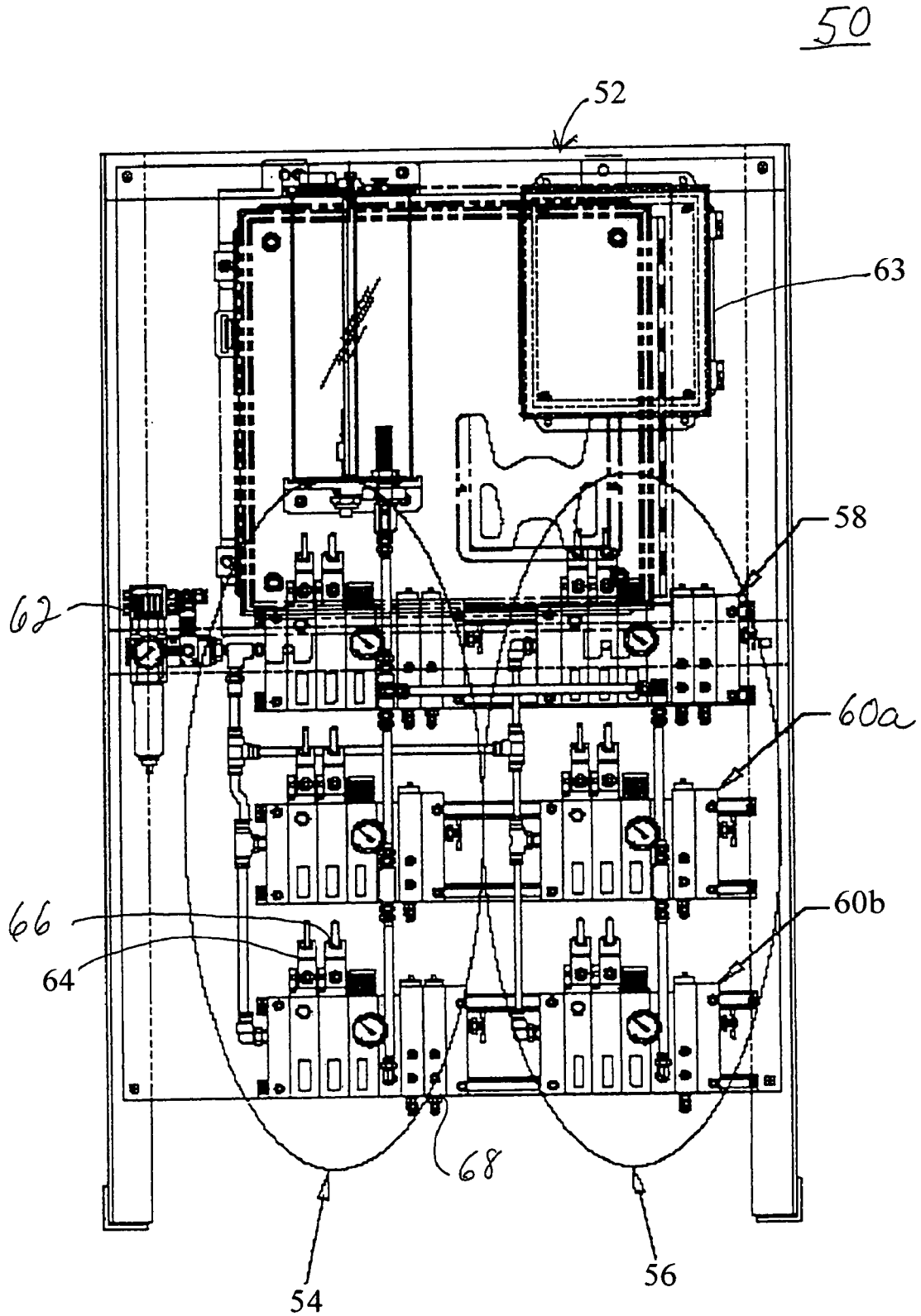
FIG. 14 is an end elevation of a manifold assembly portion of a differential lubricant applicator.
Figure 15A:
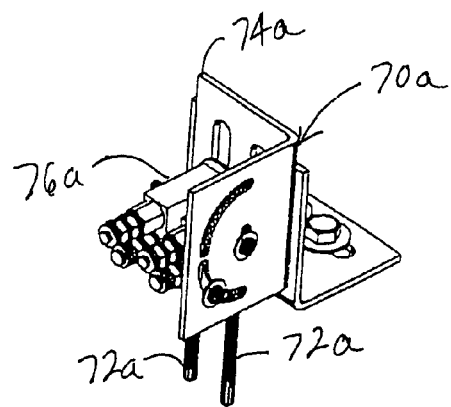
FIGS. 15a and 15b are respective left and right side chain nozzle assemblies of the differential lubricant applicator.
Figure 15B:
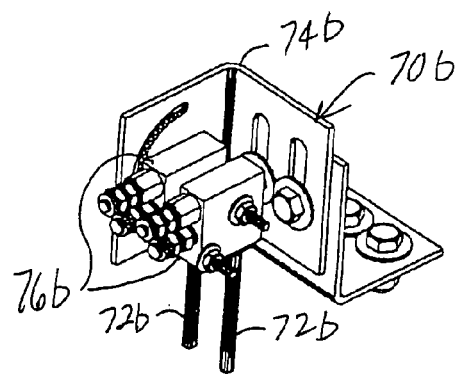

Differential lubricant applicator 50 includes a manifold assembly 52 (FIG. 14). Manifold assembly 52 includes "side A" manifolds 54 and "side B" manifolds 56. Side A manifolds 54 are connected to conveyor system 25 in order to lubricate the chain of the takeaway side of the web, namely, the side to which articles are diverted. Side B manifolds 56 are connected to conveyor system 25 in order to lubricate the chain on the other side of the web. Manifold assembly 52 includes chain manifolds 58 responsible for lubricating the chains on opposite sides of the web. Manifold assembly 52 further includes wheel manifolds 60a, 60b which are responsible for lubricating the wheels and axles at two locations on each side of the web. Manifold assembly 52 includes an air regulator 62 and a control panel 63. Each manifold includes inverter air valve 64, a nozzle air valve 66 and an injector block 68. Each lubricant manifold delivers an aerosol of oil and air mixture to the conveyor system in a manner that will be apparent to the skilled artisan. In the illustrative embodiment, differential lubricant applicator 50 is marketed by Orsco under Model No. VSR-0038-6-8 or equivalent lubrication system.

Chain manifolds 58 deliver the lubricant aerosol to left and right chain lubricant nozzle assemblies 70a, 70b (15a, 15b).

Figure 17:
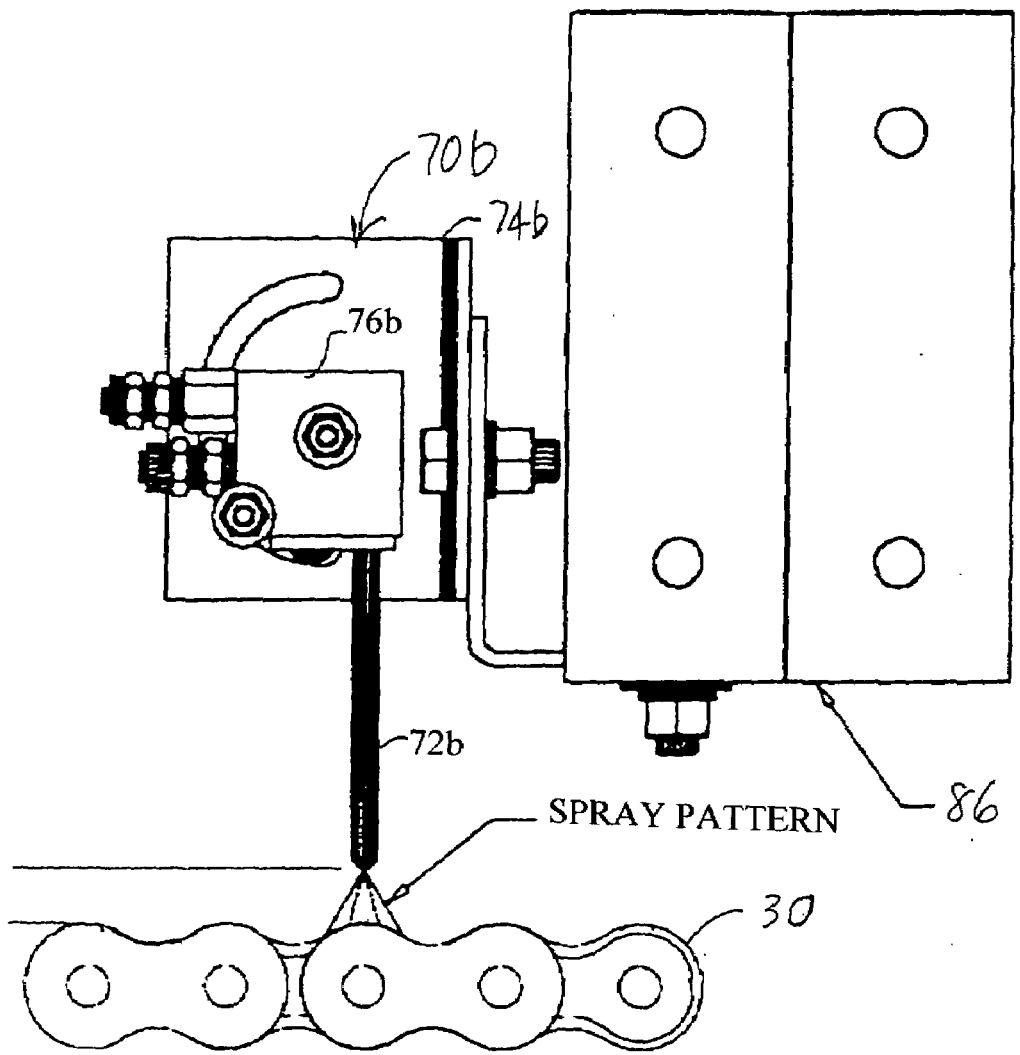
FIG. 17 is a side elevation of a chain nozzle assembly lubricating a chain.

Each chain lubricant nozzle assembly includes a pair of nozzle tips 72a, 72b which lubricate the chain links on opposite sides of the respective chain. The nozzle assembly includes a mounting bracket 74 for mounting to a convenient portion of the conveyor system 25 and a body 76a, 76b for connecting with tubing (not shown) leading back to chain manifold 58 and for conveying the aerosol to nozzle tip 72a, 72b. In the illustrative embodiment, each nozzle tip 72a, 72b is approximately three inches in length having a zero-degree spray pattern which produces a vertical cone, as is best illustrated in FIG. 17.

Figure 16A:
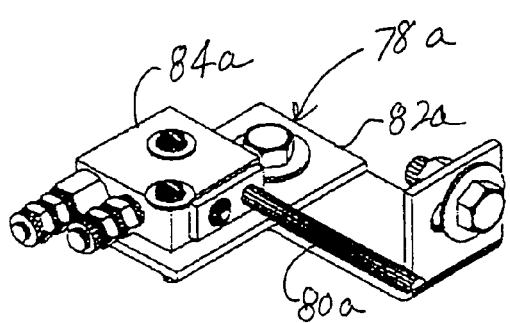
FIGS. 16a and 16b are respective left and right side wheel lubricant nozzle assemblies of the differential lubricant applicator.
Figure 16B:
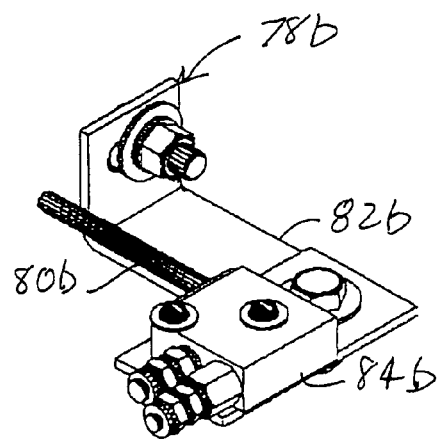
Figure 18:
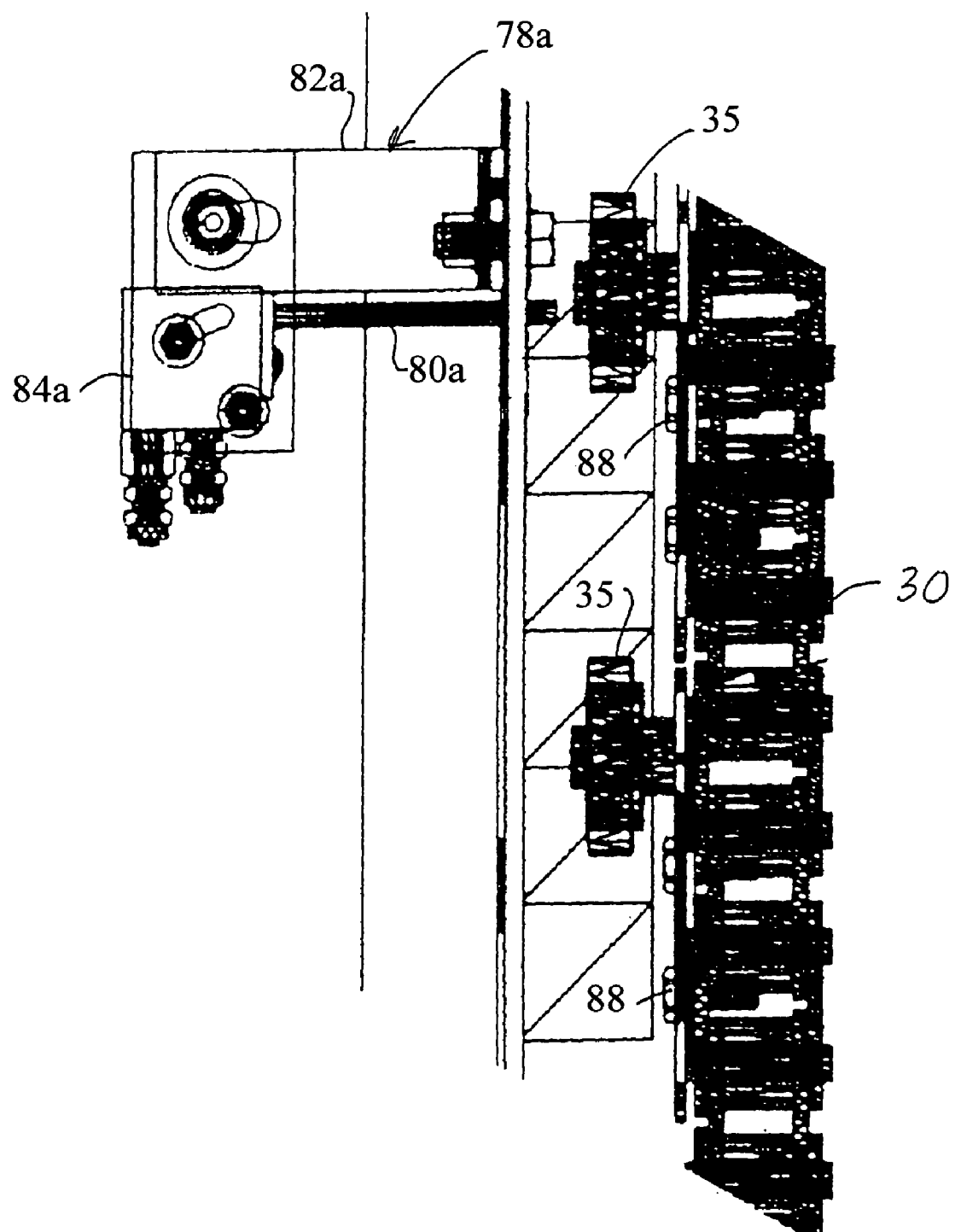
FIG. 18 is a top plan view of a wheel lubricant nozzle assembly lubricating a wheel.

Wheel manifolds 60a, 60b lead to a wheel/axle lubricant nozzle assembly 78a, 78b (FIGS. 16a, 16b). Each wheel/axle lubricant nozzle assembly includes a horizontally oriented nozzle tip 80a, 80b extending from a body 84a, 84b. Each body 84a, 84b connects with tubing (not shown) leading to the respective wheel manifold 60a, 60b and provides the lubricant aerosol to the corresponding nozzle tip 80a, 80b. A mounting bracket 82a, 82b mounts the body and, hence, the nozzle tip to the conveyor system at a convenient location. The purpose of the wheel/axle lubricant nozzle assembly is to apply lubricant to the circumference of a carrier wheel 35 and the axle face of each carrier plate 88 (FIG. 18). Two wheel/axle lubricant nozzle assemblies are provided on each side of conveyor system 25. Nozzle tip 88a, 88b in the illustrative embodiment is approximately three inches in length and has a 45 degree spray pattern which produces a cone of aerosol at an approximate 45 degree angle.

Figure 19:
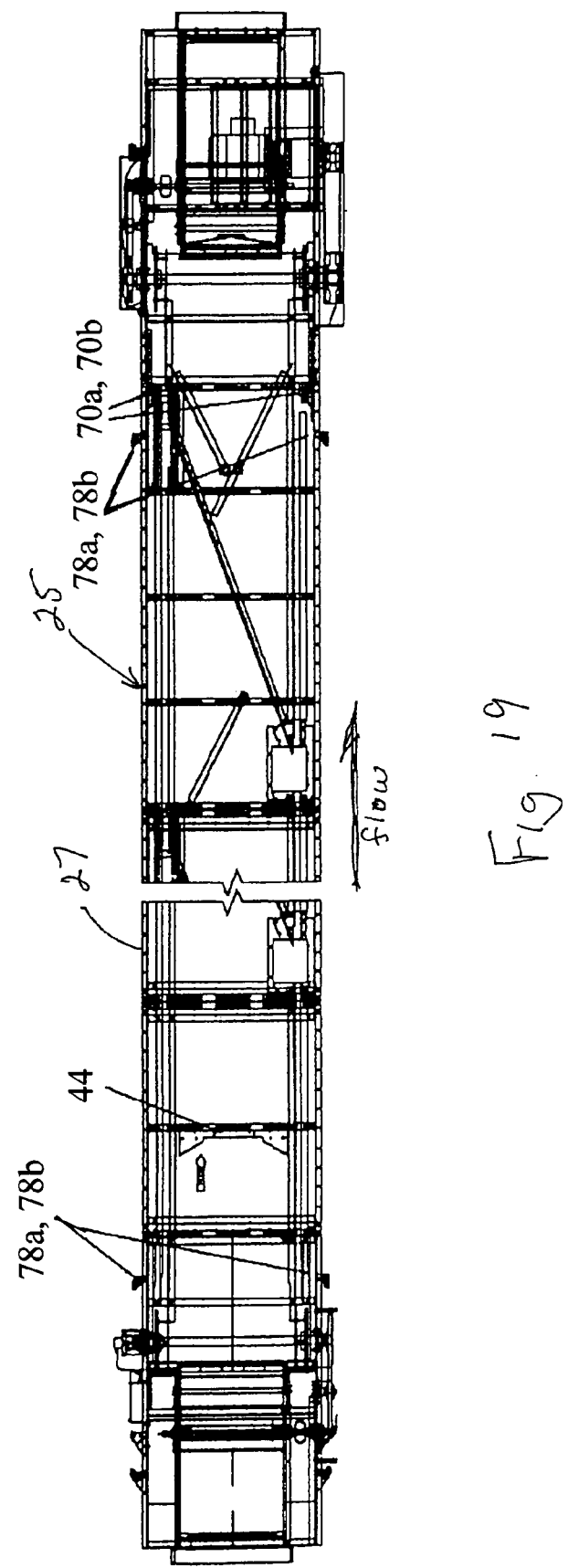
FIG. 19 is a top plan view of an article sorter frame illustrating placement of chain and wheel lubricant nozzle assemblies.

Positioning of nozzle assemblies 70a, 70b, 78a, 78b with respect to the frame of conveyor system 25 is illustrated in FIG. 19. The wheel/axle nozzle assemblies 78a, 78b are mounted at both the charge and discharge ends of the conveyor system as illustrated respectively to the left and right ends of frame assembly 27 in FIG. 19. The chain lubricant nozzle assemblies 70a, 70b are mounted at the discharge end, or downstream end, of conveyor system 25, to the right as illustrated in FIG. 19. The chain lubricant nozzle assemblies are positioned inside the catenary bed. However, it should be understood that the positioning of the nozzle assemblies is for illustration purposes only and other locations may be apparent to the skilled artisan.

In order to differentially lubricate chains 30, differential lubricant applicator 50 causes lubricant to be applied during an "on" period and not applied during an "off" period thereby establishing an application duty cycle. If it is desirable to apply more lubricant to a particular chain, the duty cycle is increased by decreasing the off time of the nozzle assembly. If it is desired to apply less lubricant to a particular chain, the duty cycle is decreased by increasing the off time of the respective nozzle assembly. One scheme for carrying out such differential lubrication is illustrated in FIG. 20. FIG. 20 illustrates six columns illustrating the off cycles for the two chain lubricant nozzle assemblies 70a, 70b and the four wheel/axle lubricant nozzles 78a, 78b. The corresponding "on" time is about one (1) second. The horizontal rows correspond to the amount of skew that is measured by skew detector 34, 134. As previously set forth, skew can be negative or positive values depending upon which lateral end of the cross members lags the other lateral end. It can be seen that for small amounts of skew, only slight variations in duty cycle are provided for opposite sides of the web. Thus, for small amounts of skew in the cross members, only a slightly greater amount of lubricant is applied to the stretched chain than to the opposite chain. However, for large amounts of skew in the cross members, almost all of the lubricant is applied to the stretched chain and little to the unstretched chain.

Variations may be made in the illustrated embodiments without departing from the scope of the invention. For example, although the differential lubricant applicator is illustrated as an aerosol applicator, mechanical applicators or drip lubricant applicators may be utilized. Also, although the skew detection is illustrated via an automated system, manual measurements of skew may also be utilized especially where the conveyor system is shut down for certain periods of the day, thus enabling skew to be manually measured. Although the invention was illustrated with a sortation conveyor, the conveyor system may, alternatively, be a slat conveyor, a traveling walkway, a baggage carrousel, or the like.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of monitoring a positive displacement article sorter, said article sorter including a frame, an endless web traveling in a longitudinal direction about said frame and an electric motor driving said endless web, said endless web defined by a pair of continuous chains and a plurality of cross members connected at opposite ends with said chains, said positive displacement sorter further including a plurality of pusher shoes, each laterally traveling along at least one of said cross members, said method comprising:
   providing a sensing assembly having first and second portions, positioning said first portion of said sensing assembly at said web, and positioning said second portion of said sensing assembly at a stationary location;
   sensing said first portion of said sensing assembly with said second portion of said sensing assembly as said first portion of said sensing assembly travels about said frame; and
   determining a parameter of said web from an output of said sensing assembly.

2. The method of claim 1, wherein the parameter of said web affects electrical energy consumed by said electric motor.

3. The method of claim 1, wherein the parameter of said web is a function of the position of said web.

4. The method of claim 1, wherein said sensing assembly comprises a magnetic sensor, a proximity sensor or a photo sensor.

5. The method of claim 1 including positioning said first portion of said sensing assembly at least one of said cross members.

6. The method of claim 5 including positioning said first portion of said sensing assembly at two spaced apart ones of said cross members.

7. The method of claim 1, wherein said plurality of cross members comprise a plurality of closely spaced slats.

8. The method of claim 7, wherein each of said slats has a generally planar upper surface wherein said web defines a flat-top conveying surface.

9. A method of monitoring a positive displacement article sorter, said article sorter including a frame, an endless web traveling in a longitudinal direction about said frame and an electric motor driving said endless web, said endless web defined by a pair of continuous chains and a plurality of cross members connected at opposite ends with said chains, said positive displacement sorter further including a plurality of pusher shoes, each laterally traveling along at least one of said cross members, said method comprising:
   providing a sensing assembly and sensing positions of opposite lateral sides of said endless web in said longitudinal direction with said sensing assembly as said endless web travels about said frame; and
   determining whether one of said opposite lateral sides lags or leads the other of said opposite lateral sides in said longitudinal direction as a function of said positions of said opposite lateral sides of said endless web in said longitudinal direction.

10. The method of claim 9 further including indicating drag of said endless web against said frame as a function of an amount that one of said opposite lateral sides lags or leads the other of said opposite lateral sides in said longitudinal direction.

11. The method of claim 9 including sensing positions of said opposite lateral sides of said endless web at an article input end of said endless web.

12. The method of claim 9 including positioning a first portion of said sensing assembly at said opposite lateral sides of said web.

13. The method of claim 12 including positioning a second portion of said sensing assembly at a stationary location and sensing said first portion of said sensing assembly with said second portion of said sensing assembly as said first portion of said sensing assembly travels about said frame.

14. The method of claim 12, wherein said sensing assembly comprises a magnetic sensor, a proximity sensor or a photo sensor.

15. The method of claim 12 including positioning said first portion of said sensing assembly at opposite lateral ends of at least one of said cross members.

16. The method of claim 15 including positioning said first portion of said sensing assembly at opposite lateral ends of at least two spaced apart ones of said cross members.

17. The method of claim 16 including determining whether one of said opposite lateral sides of said endless web lags or leads the other of said lateral sides in said longitudinal direction as a function of diagonal distances measured between said first portion of said sensing assembly at opposite lateral ends of said at least two spaced apart ones of said cross members.

18. The method of claim 9, wherein said plurality of cross members comprise a plurality of closely spaced slats.

19. The method of claim 18, wherein each of said slats has a generally planar upper surface wherein said slats define a flat-top conveying surface.

20. A positive displacement article sorter, comprising:
   a frame, an endless web traveling in a longitudinal direction about said frame and an electric motor driving said endless web, said endless web defined by a pair of continuous chains and a plurality of cross members connected at opposite ends with said chains, said positive displacement sorter further including a plurality of pusher shoes, each laterally traveling along at least one of said cross members;
   a sensing assembly having first and second portions, said first portion of said sensing assembly at said web and said second portion of said sensing assembly at a stationary location, wherein said second portion of said sensing assembly sensing said first portion of said sensing assembly as said first portion of said sensing assembly travels about said frame;
   a control that is responsive to said sensing assembly, said control adapted to determine a parameter of said web from an output of said sensing assembly.

21. The article sorter of claim 20, wherein the parameter of said web affects electrical energy consumed by said electric motor.

22. The article sorter of claim 20, wherein the parameter of said web is a function of the position of said web.

23. The article sorter of claim 20, wherein said sensor assembly comprises a magnetic sensor, a proximity sensor or a photo sensor.

24. The article sorter of claim 20, wherein said first portion of said sensing assembly is at at least one of said cross members.

25. The article sorter of claim 24, wherein said first portion of said sensing assembly is at two spaced apart ones of said cross members.

26. The article sorter of claim 20, wherein said plurality of cross members comprise a plurality of closely spaced slats.

27. The article sorter of claim 26, wherein each of said slats has a generally planar upper surface wherein said web defines a flat-top conveying surface.

28. A positive displacement article sorter, comprising:
a frame, an endless web traveling in a longitudinal direction about said frame and an electric motor driving said endless web, said endless web defined by a pair of continuous chains and a plurality of cross members connected at opposite ends with said chains, said positive displacement sorter further including a plurality of pusher shoes, each laterally traveling along at least one of said cross members;
a sensing assembly that is adapted to sense positions of opposite lateral sides of said endless web in said longitudinal direction as said endless web travels about said frame;
a control that is responsive to said sensing assembly, said control adapted to determine whether one of said opposite lateral sides lags or leads the other of said opposite lateral sides in said longitudinal direction as a function of said positions of said opposite lateral sides of said endless web in said longitudinal direction.

29. The article sorter of claim 28, wherein said control is further adapted to indicate drag of said endless web against said frame as a function of an amount that one of said opposite lateral sides lags or leads the other of said opposite lateral sides in said longitudinal direction.

30. The article sorter of claim 28, wherein said sensing assembly is adapted to sense positions of said opposite lateral sides of said endless web at an article input end of said endless web.

31. The article sorter of claim 28, wherein said sensing assembly includes a first portion that is at said opposite lateral sides of said web.

32. The article sorter of claim 31, wherein said sensing assembly includes a second portion at a stationary location, said second portion adapted to sense said first portion of said sensing assembly as said first portion of said sensor assembly travels about said frame.

33. The article sorter of claim 31, wherein said sensor assembly comprises a magnetic sensor, a proximity sensor or a photo sensor.

34. The article sorter of claim 31, wherein said first portion of said sensing assembly is at opposite lateral ends of at least one of said cross members.

35. The article sorter of claim 34, wherein said first portion of said sensing assembly is at opposite lateral ends of at least two spaced apart ones of said cross members.

36. The article sorter of claim 35, wherein said control determines whether one of said opposite lateral sides of said endless web lags or leads the other of said lateral sides in said longitudinal direction as a function of diagonal distances measured between said first portion of said sensing assembly at opposite lateral ends of said at least two spaced apart ones of said cross members.

37. The article sorter of claim 28, wherein said plurality of cross members comprise a plurality of closely spaced slats.

38. The article sorter of claim 37, wherein each of said slats has a generally planar upper surface wherein said web defines a flat-top conveying surface.

* * * * *